(12) United States Patent
Nobuyasu et al.

(10) Patent No.: US 9,719,566 B2
(45) Date of Patent: Aug. 1, 2017

(54) ONE-WAY CLUTCH

(71) Applicant: TOYOTA JIDOSHA KABUSHIKI KAISHA, Toyota-shi (JP)

(72) Inventors: Seitaro Nobuyasu, Susono (JP); Yosuke Suzuki, Hadano (JP); Takahito Endo, Sunto-gun (JP); Suguru Hirai, Nagoya (JP); Yuji Iwase, Mishima (JP); Koichi Kato, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 15/061,608

(22) Filed: Mar. 4, 2016

(65) Prior Publication Data

US 2016/0258496 A1 Sep. 8, 2016

(30) Foreign Application Priority Data

Mar. 5, 2015 (JP) ................... 2015-043232

(51) Int. Cl.
*F16D 41/12* (2006.01)
*F16D 41/18* (2006.01)
(Continued)

(52) U.S. Cl.
CPC ......... *F16D 41/185* (2013.01); *F02N 15/023* (2013.01); *F16D 1/033* (2013.01);
(Continued)

(58) Field of Classification Search
CPC .................................................. F16D 41/185
See application file for complete search history.

(56) References Cited

U.S. PATENT DOCUMENTS

2002/0027055 A1\* 3/2002 Le-Calve ............ F16D 41/185
192/46
2010/0108455 A1\* 5/2010 Shirataki ............ F16D 41/066
192/45.008
(Continued)

FOREIGN PATENT DOCUMENTS

JP     H 10-274189 A    10/1998
JP     2008-002302 A    1/2008
(Continued)

OTHER PUBLICATIONS

Extended European Search Report issued Oct. 26, 2016 in Patent Application No. 16158587.2, 7 Pages.

Primary Examiner — Jacob S Scott
Assistant Examiner — Lillian Nguyen
(74) Attorney, Agent, or Firm — Oblon, McClelland, Maier & Neustadt, L.L.P.

(57) ABSTRACT

A one-way clutch includes a first rotational member, a second rotational member, and a first rotational body. The second rotational member has plural first through holes in which bolts are inserted. A dimension of the first through hole in a circumferential direction is larger than a dimension of the first through hole in a radial direction. A first region and a second region are obtained by dividing the first through hole into two regions in the circumferential direction. The first region is located ahead of the second region in a rotatable direction of the second rotational member. The bolts are inserted such that the each of the bolts is located in the first region of the first through hole, and the second rotational member and the first rotational body are fastened by the bolts.

3 Claims, 11 Drawing Sheets

(51) Int. Cl.
*F16D 1/033* (2006.01)
*F16D 1/076* (2006.01)
*F02N 15/02* (2006.01)
*F16D 41/00* (2006.01)

(52) U.S. Cl.
CPC ............. *F16D 1/076* (2013.01); *F16D 41/00* (2013.01); *F16D 41/12* (2013.01); *F16D 2300/12* (2013.01)

(56) References Cited

U.S. PATENT DOCUMENTS

2013/0218432 A1* 8/2013 Kudo .................... F02N 15/023
 701/67
2013/0228410 A1 9/2013 Sugimura

FOREIGN PATENT DOCUMENTS

| JP | 2008-057702 A | 3/2008 |
| JP | 5288051 B2 | 6/2013 |
| WO | WO 95/29833 | 11/1995 |
| WO | 2012/073309 A1 | 7/2012 |

* cited by examiner

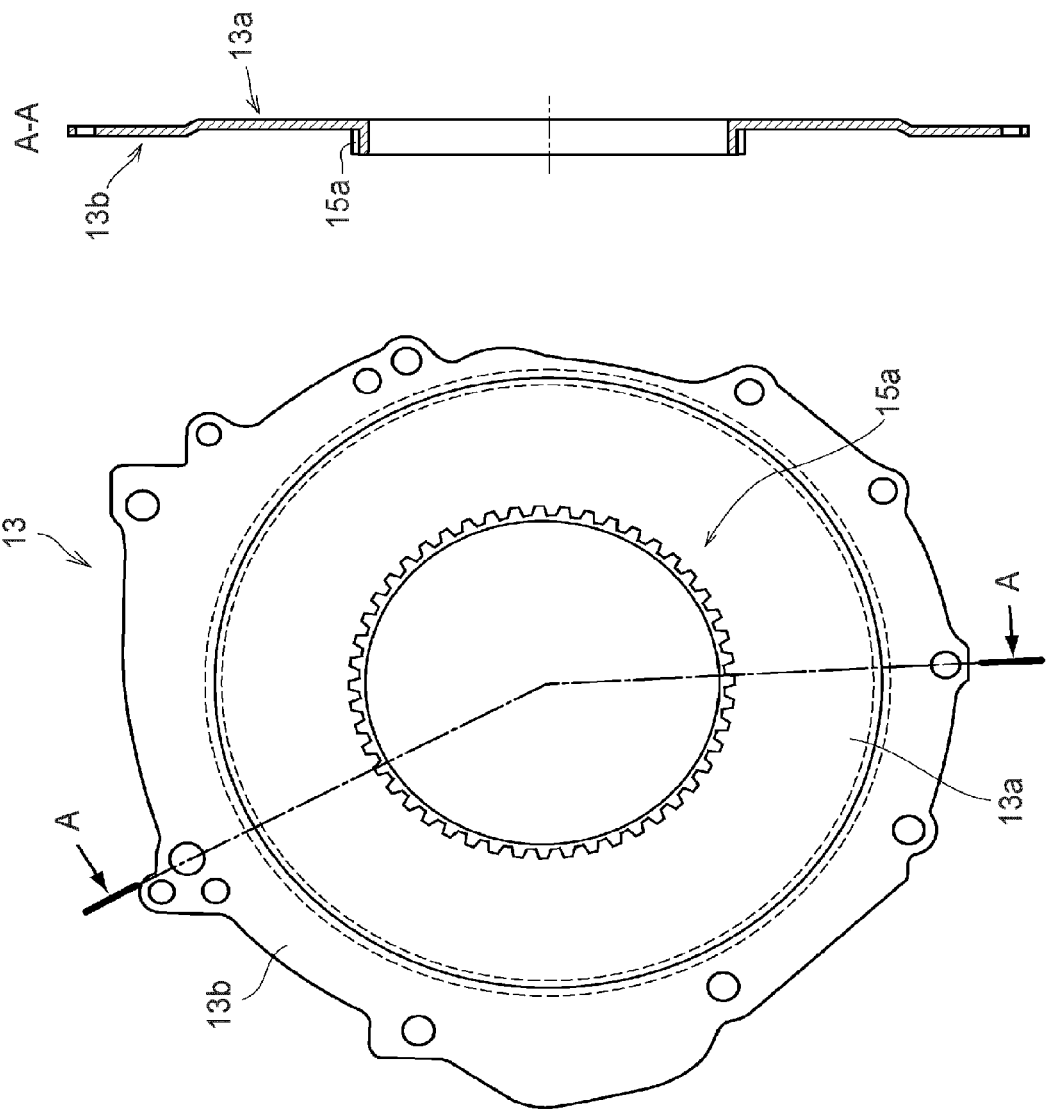

ONE-WAY CLUTCH

INCORPORATION BY REFERENCE

The disclosure of Japanese Patent Application No. 2015-043232 filed on Mar. 5, 2015 including the specification, drawings and abstract is incorporated herein by reference in its entirety.

BACKGROUND

1. Field

This disclosure relates to a one-way clutch that is used as a brake mechanism for fixing either one of two rotational members that rotate relative to each other and thereby allowing rotation of the either one of the two rotational members in one rotational direction while restricting rotation thereof in the other rotational direction.

2. Description of Related Art

A one-way clutch can function as a brake mechanism for unrotatably fixing either one of two rotational members of the one-way clutch that rotate relative to each other and thereby restricting rotation of the either one of the two rotational members in only one direction. For example, a rotational direction of a rotational body, such as an output shaft of an engine or a motor, can be restricted in only one direction by fastening the one rotational member of the one-way clutch to the rotational body and fixing the other rotational member to a fixing body, such as an engine block or a transmission housing. The one rotational member of the one-way clutch and the rotational body are typically fastened by a bolt.

The disclosure related to a structure of the one-way clutch as described above and an assembling method thereof is described in Japanese Patent No. 5288051. The one-way clutch described in this Japanese Patent No. 5288051 is assembled to the engine block by using a jig that has a male screw section and a pin-shaped section for positioning. More specifically, first, an inner race, an outer race, and an engagement member that constitute the one-way clutch are integrally and temporarily assembled by the male screw section of the jig. A flywheel is positioned with respect to the temporarily assembled one-way clutch by the pin-shaped section of the jig. Then, these one-way clutch and flywheel are fixed to a flange that is provided at a tip of a crankshaft by the bolt.

As in the configuration described in above Japanese Patent No. 5288051, it is common that the one-way clutch is fixed to the flange of the rotational body that is formed with a screw hole by the bolt, for example. Torque can reliably be transmitted between the one-way clutch and the rotational body when the one-way clutch is fixed by the bolt. However, when the bolt is used to fasten the one-way clutch and the rotational body, a phase of a bolt hole, which is formed in the one-way clutch, and a phase of the screw hole, which is formed in the flange of the rotational body, have to be coincided with each other during assembly. When the bolt is fastened in a state where the phase of the bolt hole and the phase of the screw hole are not coincided with each other, the screw hole and a screw head of the bolt possibly interfere with each other, and thus an appropriate bolt fastening force cannot possibly be obtained.

In particular, in the case where the one-way clutch is used as the brake mechanism as described above, relative rotation between the two rotational members of the one-way clutch is limited to the one direction. Thus, there is a case where the phase of the bolt hole and the phase of the screw hole are not easily coincided with each other. It should be noted that the phase of the bolt hole and the phase of the screw hole can easily be coincided with each other by increasing a radius of the bolt hole. However, an area of a seat surface that receives an axial force from the bolt during fastening is reduced by an increase in the radius of the bolt hole. Thus, also in this case, the appropriate bolt fastening force cannot possibly be obtained.

SUMMARY

This disclosure provides a one-way clutch that can secure favorable assemblability of the one-way clutch with a rotational body and fix the one-way clutch and the rotational body with an appropriate bolt fastening force when the one-way clutch is used as a brake mechanism.

A one-way clutch related to the present disclosure includes a first rotational member, a second rotational member, and a first rotational body. The second rotational member is configured to rotate relative to the first rotational member. The second rotational member has plural first through holes in which bolts are inserted. The first rotational member and the second rotational member are configured to be engaged only in a specified rotational direction. The second rotational member is configured to restrict rotation in the specified rotational direction by unrotatably fixing the first rotational member. The first rotational body has plural screw holes to which the bolts are fitted. The first rotational body and the second rotational member are configured to restrict rotation of the first rotational body in the specified rotational direction by being fastened by the bolts to each other. A dimension of the first through hole in a circumferential direction of a pitch circle in which the first through hole is arranged is larger than a dimension of the first through hole in a radial direction of the pitch circle. The first through hole has a first region and a second region. The first region and the second region are obtained by dividing the first through hole into two regions in the circumferential direction. The first region is located ahead of the second region in a rotatable direction of the second rotational member. The bolts are inserted such that the each of the bolts is located in the first region of the first through hole, and the second rotational member and the first rotational body are fastened by the bolts.

According to this one-way clutch, the first rotational member is unrotatably fixed. Accordingly, this one-way clutch is used as the brake mechanism that restricts the rotation of the second rotational member in the specified rotational direction. In addition, the second rotational member of the one-way clutch as described above is fastened to the first rotational body by the bolt. In this way, the one-way clutch functions as the brake mechanism that restricts the rotation of the first rotational body in the specified rotational direction. The first rotational body is formed with the screw hole to which the fastening bolt is fitted, and the second rotational member is formed with the first through hole in which the fastening bolt is inserted. Accordingly, the second rotational member and the first rotational body are fastened by inserting the bolt in the first through hole of the second rotational member and fitting the bolt to the screw hole of the first rotational body. In this case, the first through hole in this disclosure is the long hole that has the larger hole dimension in the circumferential direction of the pitch circle, in which the first through hole is arranged, than the hole dimension in the radial direction of the pitch circle. Thus, the phase of the first through hole of the second rotational member can easily be coincided with the phase of the screw hole of the first rotational body in the circumferential direction of the pitch circle. Therefore, assemblability of the one-way clutch with the first rotational body can be improved.

The one-way clutch may further include a second rotational body. The second rotational body has plural second through holes. The second through holes are circular bolt holes in which the bolts are inserted. A dimension of the first through hole in the radial direction is substantially equal to a diameter of the second through hole. The second rotational member is arranged between the first rotational body and the second rotational body, and, together with the second rotational member, the second rotational body is fastened to the first rotational body by the bolt.

The one-way clutch may further include a fixing body, a fixing plate fastened to the fixing body. The first rotational member is unrotatably fixed via the fixing plate. The second rotational member and the fixing plate each have a mark. When positions of the marks of the second rotational member and the fixing plate are coincided with each other, a phase of the second rotational member is coincided with a phase of the fixing plate in the circumferential direction such that each of the bolts is located in the first region.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a view for explaining a shape of the fixing plate in the one-way clutch shown in FIG. 2;

DETAILED DESCRIPTION OF EMBODIMENTS

Figure 1:
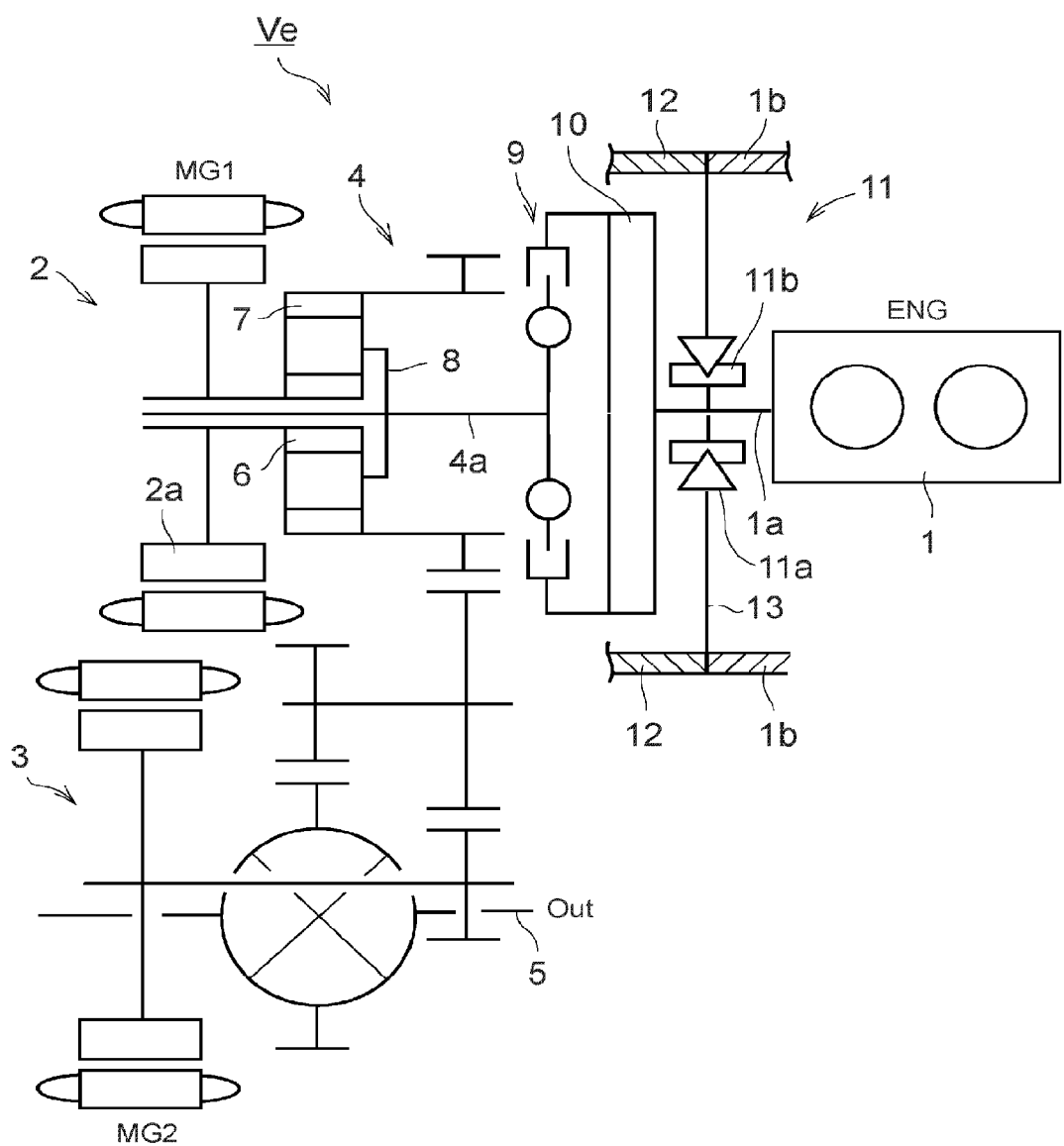
FIG. 1 is a view of one example of a configuration of a vehicle in which a one-way clutch of this disclosure is mounted.

Next, this disclosure will specifically be described with reference to the drawings. One example of a vehicle Ve that uses a one-way clutch as a target of this disclosure is shown in FIG. 1. The vehicle Ve is a hybrid vehicle in which an engine (ENG) 1, a first motor (MG1) 2, and a second motor (MG2) 3 as drive power sources are mounted. This vehicle Ve is configured to divide power output by the engine 1 by a power split mechanism 4 and transmit the power to the first motor 2 and a drive shaft 5. In addition, the vehicle Ve is configured to drive the second motor 3 by electric power that is generated by the first motor 2 and be able to add power output by the second motor 3 to the drive shaft 5.

The power split mechanism 4 is constructed of a planetary gear unit that has a sun gear 6, a ring gear 7, and a carrier 8, for example. In this example shown in FIG. 1, a planetary gear unit of a single pinion type is used. The planetary gear unit, which constitutes this power split mechanism 4, is arranged on a same rotational axis as an output shaft 1a of the engine 1.

The first motor 2 is coupled to the sun gear 6 of the above planetary gear unit. More specifically, the first motor 2 is arranged on an opposite side of the engine 1 with the power split mechanism 4 being interposed therebetween, and a rotor 2a of the first motor 2 is coupled to the sun gear 6. The ring gear 7 as an internal gear is coaxially arranged with respect to this sun gear 6. A pinion gear that meshes with these sun gear 6 and ring gear 7 is held by the carrier 8 in a manner to be able to rotate and revolve. An input shaft 4a of this power split mechanism 4 is coupled to the carrier 8. The input shaft 4a is coupled to the output shaft 1a of the engine 1 via a damper mechanism 9, a flywheel 10, and a one-way clutch 11.

The damper mechanism 9 is used to suppress a fluctuation in torque of the output shaft 1a and a torsional vibration caused by the fluctuation in the torque, and is assembled to integrally rotate with the flywheel 10, for example.

In addition, the one-way clutch 11 is arranged between a housing 12 and an engine block 1b of the engine 1. The housing 12 accommodates a transmission mechanism for constituting a drive system of this vehicle Ve that includes this one-way clutch 11, the first motor 2, the second motor 3, and the like. The housing 12 and the engine block 1b are integrally fixed by fastening a bolt by interposing a fixing plate 13 of the one-way clutch 11, which will be described below, therebetween.

The one-way clutch 11 is constructed of an inner race 11a and an outer race 11b that rotate relative to each other, the fixing plate 13, and an engagement mechanism (for example, a ratchet mechanism 16, which will be described below). The inner race (a first rotational member) 11a and the fixing plate 13 are fastened by splines or serration, for example. The fixing plate 13 is fixed to the housing 12 and the engine block 1b (a fixing body), which are described above. The outer race (a second rotational member) 11b is attached to the above output shaft 1a (a first rotational body). The engagement mechanism is engaged only in either one of the rotational directions, so as to be able to transmit the torque between the inner race 11a and the outer race 11b. Here, the fixing body is a member that is fixed to the vehicle. Alternatively, the fixing body is a member that is not displaced with respect to the vehicle.

This one-way clutch 11 functions as a brake mechanism that restricts rotation in only one direction by fixing the one inner race 11a via the fixing plate 13 as described above. More specifically, the one-way clutch 11 is configured to be disengaged when the output shaft 1a makes positive rotation and be engaged to stop the rotation when the torque in a direction to cause reverse rotation of the output shaft 1a acts on the output shaft 1a. The positive rotation is rotation in a rotational direction of a crankshaft (the output shaft 1a) when the engine 1 is operated for combustion, and the reverse rotation is rotation in a reverse direction of the positive rotation.

The vehicle Ve, which is configured as described above, is controlled such that each of the drive power sources of the engine 1, the first motor 2, and the second motor 3 is effectively used to achieve favorable energy efficiency or fuel economy and that requested drive power can be satisfied. In particular, in the case where the high drive power is requested during an EV travel in which the operation of the engine 1 is stopped and the vehicle Ve travels by output of the motors only, the EV travel by the output of both of the first motor 2 and the second motor 3 is conducted. More specifically, the first motor 2 is controlled to rotate in a reverse rotational direction and output the torque as the motor, and the second motor 3 is controlled to rotate in a positive rotational direction and output the torque as the motor. In this case, the one-way clutch 11 is engaged because the torque in the reverse rotational direction acts on the output shaft 1a of the engine 1. As a result, the vehicle Ve can efficiently make the EV travel at high output by the output of both of the first motor 2 and the second motor 3 in a state where the rotation of the output shaft 1a of the engine 1 and the rotation of the carrier 8 of the power split mechanism 4 are stopped. In addition, in this vehicle Ve, by using the one-way clutch 11 as described above, the rotation of the output shaft 1a and the rotation of the carrier 8 are easily stopped and can be thus fixed without executing any special operation or control during the EV travel by the output of both of the first motor 2 and the second motor 3.

Figure 2:
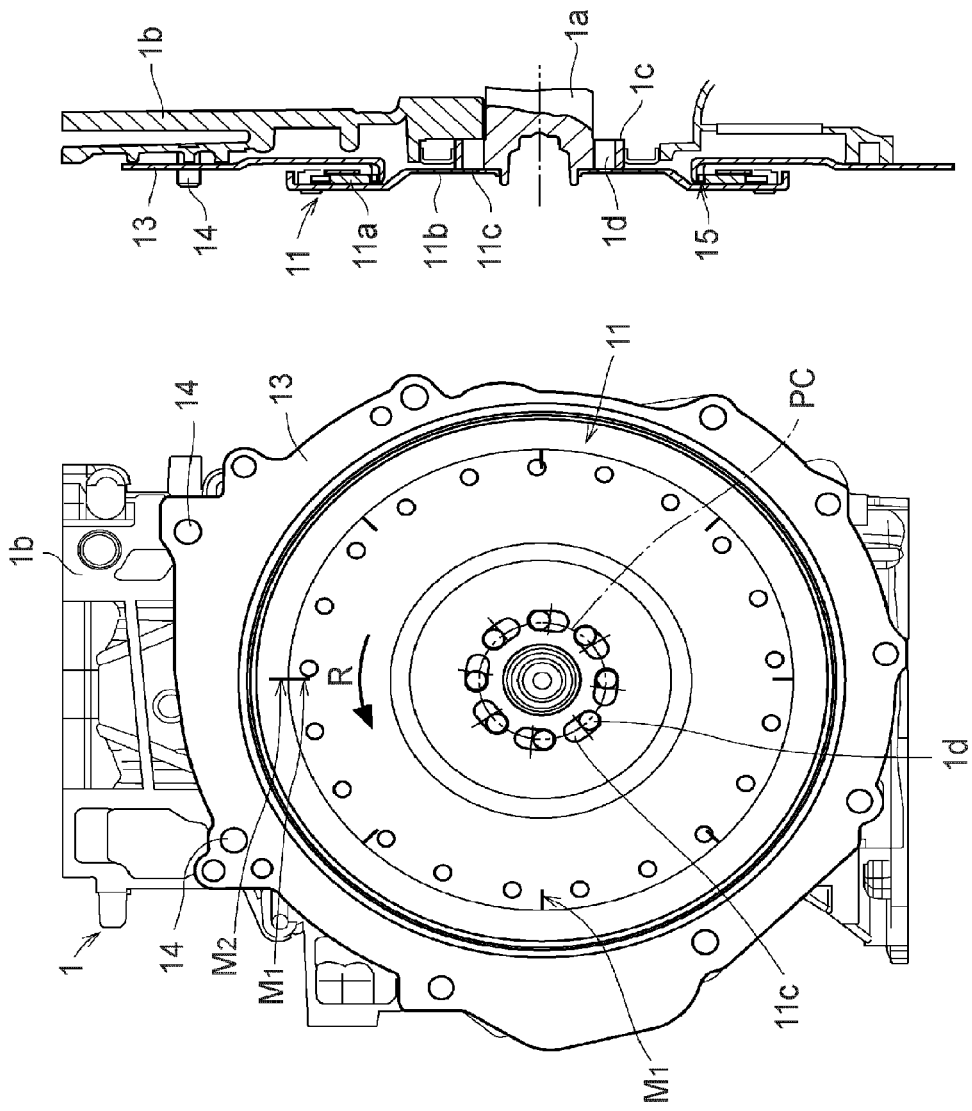
FIG. 2 is a view for explaining a configuration of the one-way clutch of this disclosure and is a view of a state where the one-way clutch and a fixing plate are attached to an engine block (a fixing body)

FIG. 2, FIG. 3, FIG. 4A, and FIG. 4B each show a specific example of the one-way clutch 11, to which this disclosure is applied, and the fixing plate 13 in the one-way clutch 11. As shown in FIG. 2, the outer race 11b of the one-way clutch 11 is attached to a flange 1c that is formed at a tip of the output shaft 1a of the engine 1. This FIG. 2 shows a state where the one-way clutch 11 and the fixing plate 13 are positioned by a knock pin 14 and the outer race 11b is temporarily attached to the flange 1c of the output shaft 1a.

The fixing plate 13 is attached to the inner race 11a of the one-way clutch 11. As shown in FIG. 3, the fixing plate 13 is constructed of a base body section 13a, a central portion of which is cut out in a circular shape, and a flange section 13b that is located in an outer circumferential portion of the base body section 13a. The inner race 11a and the fixing plate 13 are fastened by a spline 15. In the example shown in FIG. 2, FIG. 3, FIG. 4A, and FIG. 4B, a spline shaft 15a is formed in the base body section 13a of the fixing plate 13, and a spline hole 15b that is fitted to the spline shaft 15a is formed in the inner race 11a. In addition, the flange section 13b as an outer circumferential portion of the fixing plate 13 is positioned by the knock pin 14 and is temporarily attached to the engine block 1b as described above.

Figure 4B:
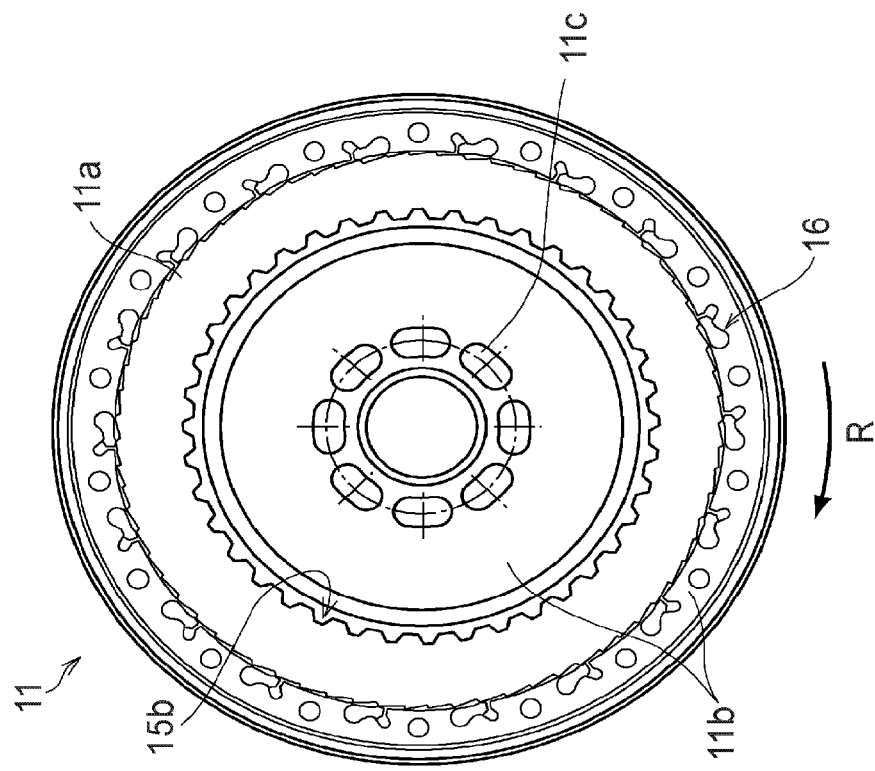
FIG. 4B is a view for explaining the configuration of the one-way clutch of this disclosure and is a back view of one example of a ratchet mechanism of the one-way clutch.
Figure 4A:
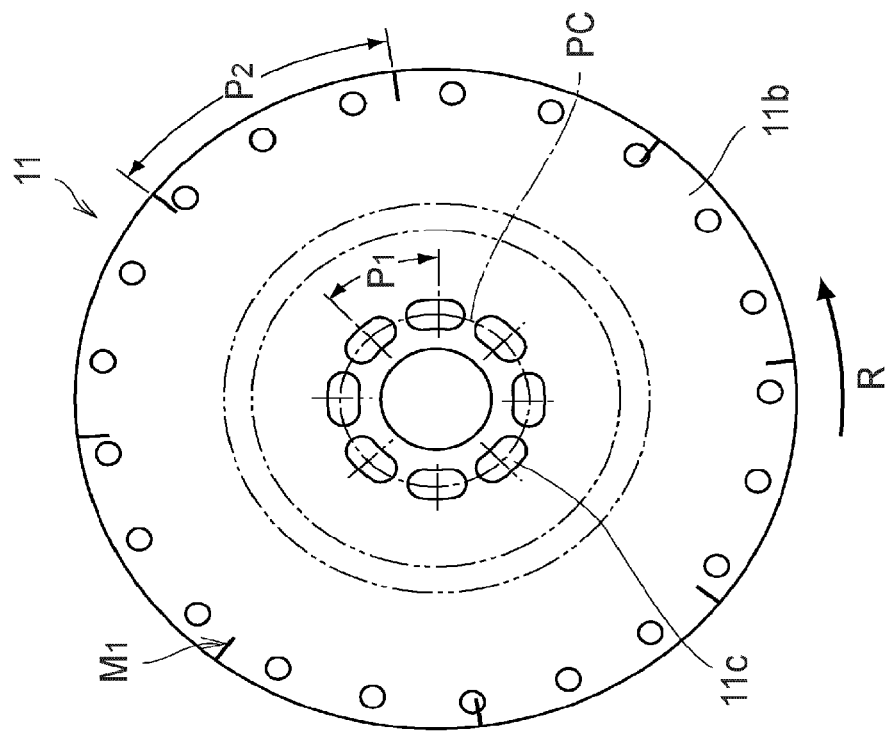
FIG. 4A is a view for explaining the configuration of the one-way clutch of this disclosure and is a front view of an outer shape of the one-way clutch.

The one-way clutch 11 is provided with the engagement mechanism between the inner race 11a and the outer race 11b. As one example, the engagement mechanism is constructed of the ratchet mechanism 16 as shown in FIG. 4A and FIG. 4B. In addition to the engagement mechanism of a ratchet type, a conventionally-known engagement mechanism, such as of a sprag type, a pole type, or a cam type, can also be used. This engagement mechanism 16 is configured to be disengaged so as to allow relative rotation between the inner race 11a and the outer race 11b when the torque in the positive rotational direction acts on the outer race 11b and to be engaged so as to integrate the inner race 11a and the outer race 11b when the torque in the reverse rotational direction acts on the outer race 11b. Accordingly, this one-way clutch 11 is configured to transmit the torque between the output shaft 1a and the input shaft 4a when the output shaft 1a makes the positive rotation and to function as the brake mechanism for stopping the rotation of the output shaft 1a for fixation together with the inner race 11a when the torque in the reverse rotational direction acts on the output shaft 1a. It should be noted that an arrow R in FIG. 2, FIG. 4A, and FIG. 4B indicates a rotational direction of the torque that is transmitted by the one-way clutch 11, that is, a direction in which the outer race 11b can rotate.

As described above, this one-way clutch 11 is arranged between the engine 1 and the housing 12 and is assembled to the engine 1. More specifically, the inner race 11a of the one-way clutch 11 is fixed to the engine block 1b via the fixing plate 13. In addition, the outer race 11b is attached to rotate integrally with the flange 1c of the output shaft 1a. The outer race 11b and the flange 1c are fastened by the bolt. Accordingly, the flange 1c is formed with plural screw holes 1d to which fastening bolts are fitted. In the example shown in FIG. 2, the eight screw holes 1d are formed at equally-spaced intervals on a pitch circle PC of the flange 1c. In addition, plural bolt holes (first through holes) 11c, in which the fastening bolts are inserted, are formed in the outer race 11b. In the example shown in FIG. 2, the eight bolt holes 11c are formed at equally-spaced intervals on the pitch circle PC of the outer race 11b. The screw holes 1d and the bolt holes 11c are formed at a same pitch $p_1$ on the same pitch circle PC.

Figure 5:
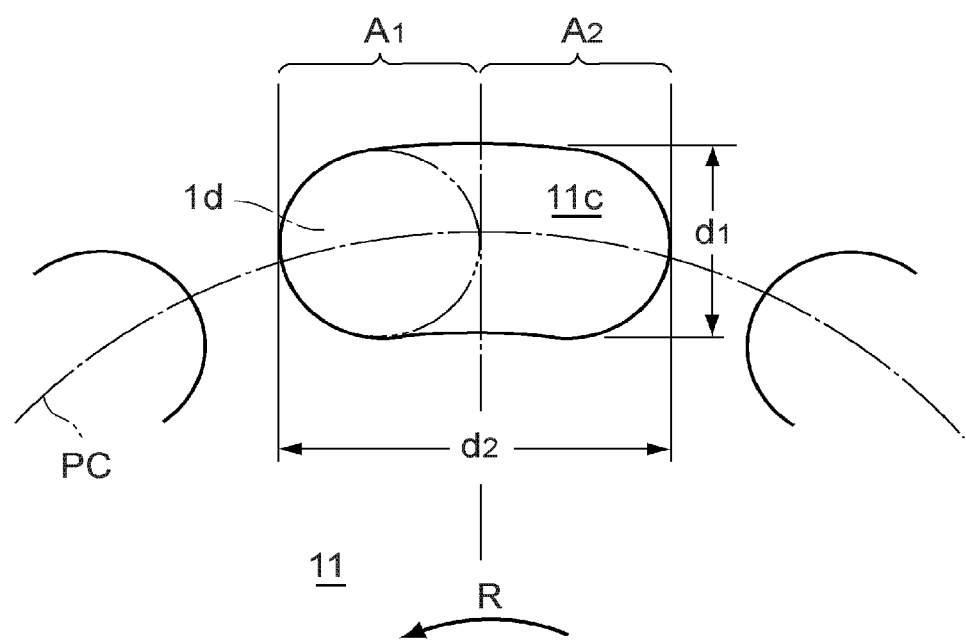
FIG. 5 is an enlarged view for explaining a shape of a bolt hole (a first through hole) in an outer race (a second rotational member) of the one-way clutch shown in FIG. 2, FIG. 4A, and FIG. 4B as well as a first region and a second region.

As shown in FIG. 5, the bolt hole 11c in this one-way clutch 11 is formed as a long hole that has a larger dimension $d_2$ in a circumferential direction of the pitch circle PC (a horizontal direction in FIG. 5) than a dimension $d_1$ in a radial direction of the pitch circle PC (a vertical direction in FIG. 5). Accordingly, when the outer race 11b is fastened to the flange 1c of the output shaft 1a by the bolt, a phase of the bolt hole 11c of the outer race 11b can easily be coincided with a phase of the screw hole 1d of the flange 1c in the circumferential direction of the pitch circle PC.

Furthermore, this one-way clutch 11 is configured to be able to fasten the outer race 11b and the flange 1c by the bolt with an appropriate fastening force while avoiding interference between the bolt hole 11c and a screw head of the bolt when the outer race 11b is fastened to the flange 1c by the bolt. Accordingly, in this one-way clutch 11, the outer race 11b and the fixing plate 13 are each provided with a mark that is used to set a rotational position of the outer race 11b during assembly at an optimum position. In the example shown in FIG. 2, FIG. 4A, and FIG. 4B, eight marks $M_1$ that correspond to the number of the bolt holes 11c and the number of the screw holes 1d are provided in an outer edge portion of the outer race 11b. These eight marks $M_1$ are arranged at equally-spaced intervals in the outer edge portion of the outer race 11b, and a pitch $p_2$ thereof corresponds to the pitch $p_1$ of the bolt holes 11c and the screw holes 1d. In addition, one mark $M_2$ that is coincided with the mark $M_1$ of the outer race 11b is provided in the fixing plate 13.

Positions of the above marks $M_1$ and mark $M_2$ are set such that the fastening bolt is located in a first region $A_1$ of regions $A_1$, $A_2$ that are formed by dividing the bolt hole 11c into two in the circumferential direction of the pitch circle PC when either one of the marks $M_1$ is coincided with the mark $M_2$ during the assembly of the one-way clutch 11. That is, the positions of the marks $M_1$ and the mark $M_2$ are set such that a phase of the first region of the bolt hole 11c and the phase of the screw hole 1d of the flange 1c correspond to each other in the circumferential direction of the pitch circle PC when the marks $M_1$ is coincided with the mark $M_2$. The first region $A_1$ is a region that is located on a side where the outer race 11b can rotate (in a direction indicated by the arrow R in FIG. 5) in the circumferential direction of the pitch circle PC. That is, the first region $A_1$ is located ahead of the second region $A_2$ in a rotatable direction of the outer race 11b. Accordingly, even in the case where the screw head of the bolt and an inner surface of the bolt hole 11c interfere with each other during fastening of the bolt, the outer race 11b can move so as to escape in a direction to eliminate the interference. Thus, these outer race 11b and output shaft 1a can appropriately be fastened by the bolt while avoiding such interference.

It should be noted that, as will be described below, the output shaft 1a and the flywheel 10 are fastened by the bolt with the outer race 11b being interposed therebetween in this one-way clutch 11. In this case, the flywheel 10 is formed with a bolt hole 10a in a circular shape in which the fastening bolt is inserted, that is, in a normal shape. Accordingly, even when the bolt hole 11c of the outer race 11b is the long hole as described above, the outer race 11b and the flywheel 10 can appropriately be fastened to the flange 1c of the output shaft 1a by the bolt with a fastening force equivalent to the fastening force needed for normal fastening of the bolt for which the long hole is not used.

Figure 6:
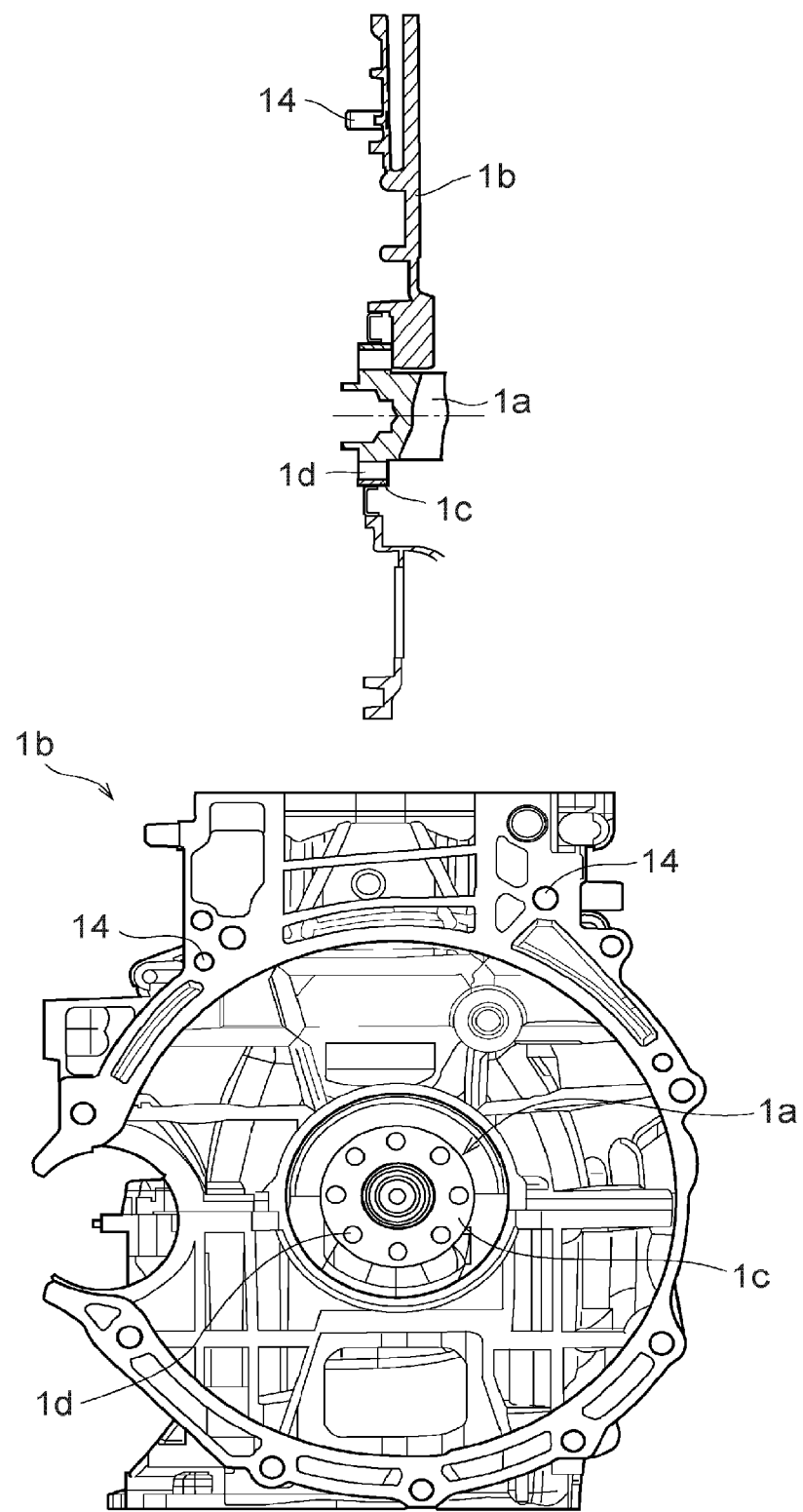
FIG. 6 is a view for explaining an assembling procedure of the one-way clutch of this disclosure and is a view of the engine block (the fixing body) before the one-way clutch is attached thereto.

An assembling procedure of the one-way clutch 11 is shown in FIG. 6 to FIG. 11. FIG. 6 shows a state of the engine block 1b before the one-way clutch 11 is assembled thereto. The screw holes 1d for fastening the bolts are formed in the flange 1c at the tip of the output shaft 1a. The knock pins 14 for positioning are attached to a mating surface of the engine block 1b with the housing 12.

Figure 7:
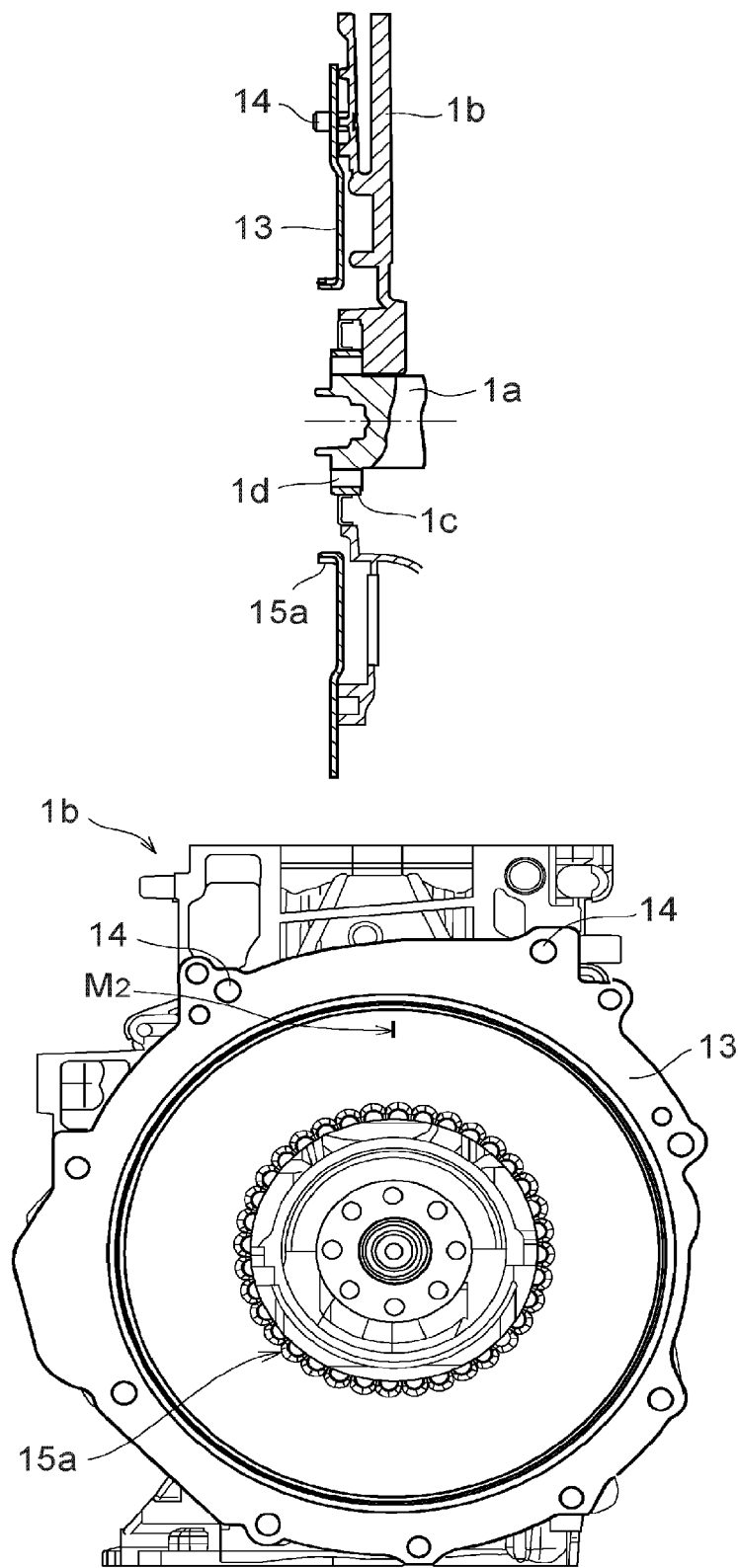
FIG. 7 is a view for explaining the assembling procedure of the one-way clutch of this disclosure and is a view of a state where the fixing plate is fixed to the engine block (the fixing body)

First, the fixing plate 13 of the one-way clutch 11 is positioned by the knock pins 14 and attached to the engine block 1b (FIG. 7). The spline shaft 15a, which is fitted to the spline hole 15b formed in the inner race 11a, appears on a surface on an opposite side of an attached surface of the fixing plate 13 to the engine block 1b. In addition, the mark $M_2$, which will be coincided with the mark $M_1$ provided in the outer race 11b, appears.

Figure 8:
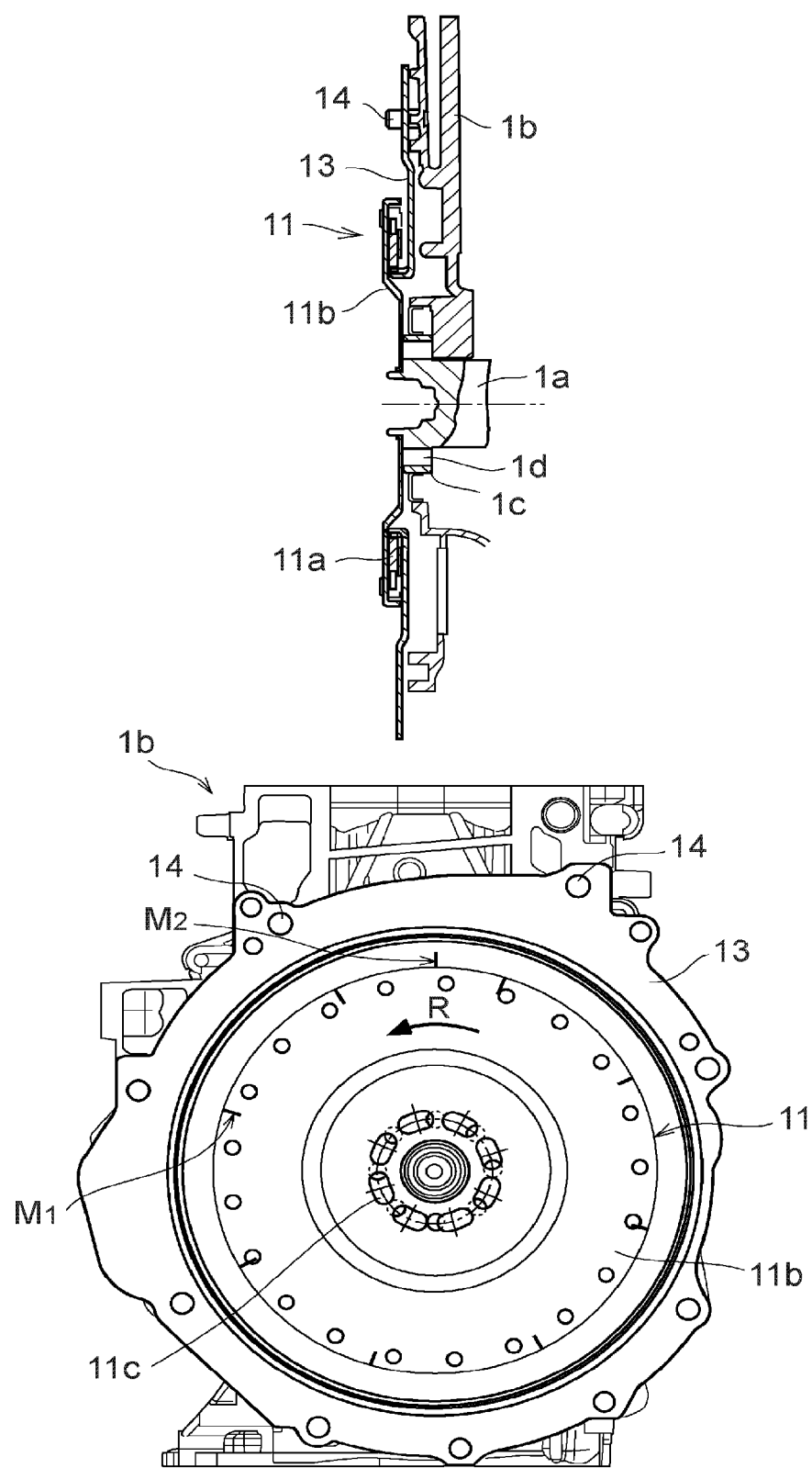
FIG. 8 is a view for explaining the assembling procedure of the one-way clutch of this disclosure and is a view of a state where the fixing plate and an inner race (a first rotational member) are spline-fitted.

The one-way clutch 11 is assembled to the fixing plate 13 that is attached to the engine block 1b (FIG. 8). More specifically, the spline shaft 15a, which is formed in the fixing plate 13, and the spline hole 15b, which is formed in the inner race 11a, are fitted to each other, and the fixing plate 13 and the one-way clutch 11 are thereby assembled.

The marks $M_1$ appear on a surface of the one-way clutch 11 that is on the opposite side of the attached surface to the fixing plate 13, that is, on a surface of the outer race 11b. At this stage, the mark $M_1$ and the mark $M_2$ have not yet been coincided with each other.

Figure 9:
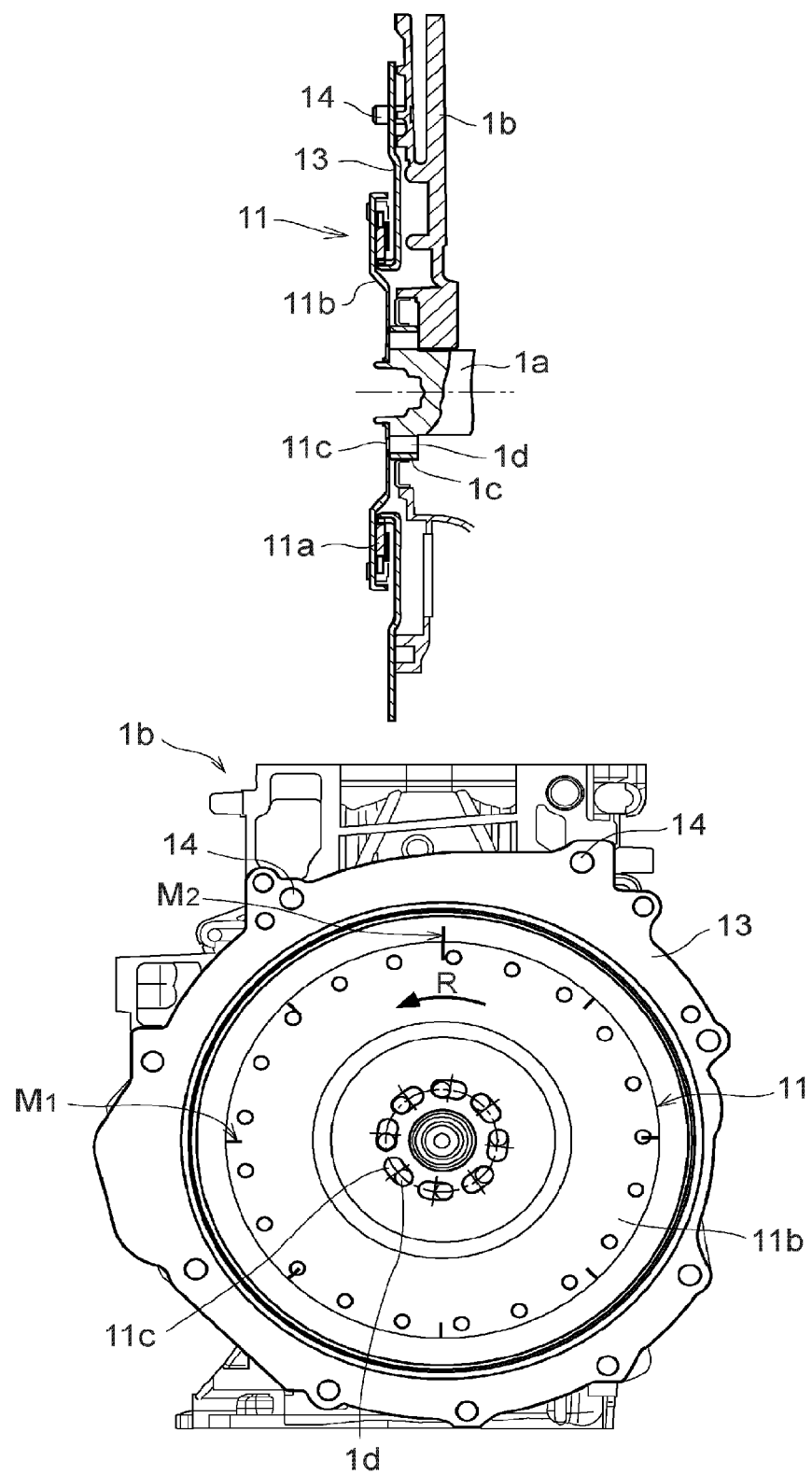
FIG. 9 is a view for explaining the assembling procedure of the one-way clutch of this disclosure and is a view of a state where a mark on the fixing plate and a mark on the outer race (the second rotational member) are coincided with each other.
Figure 10:
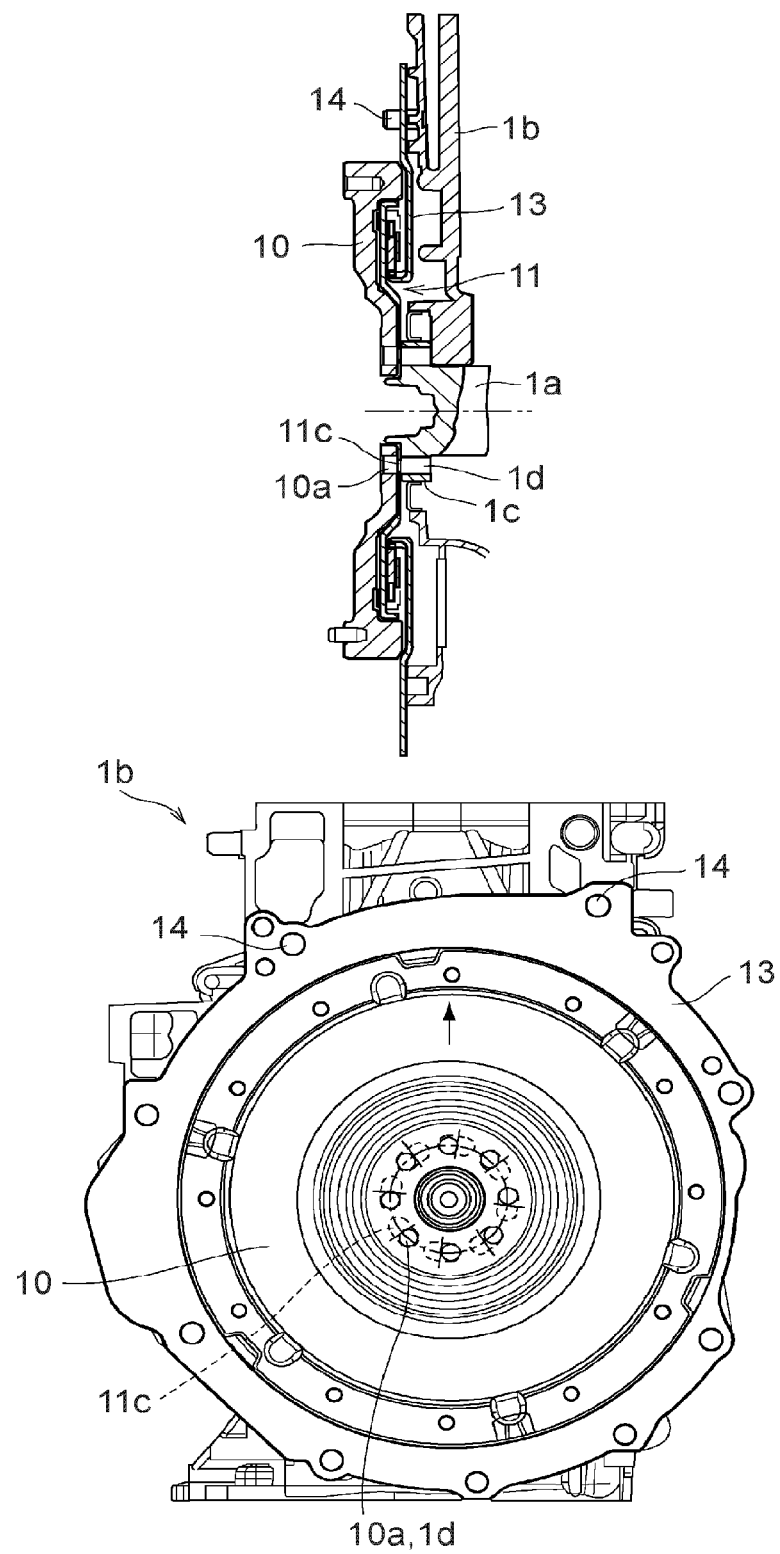
FIG. 10 is a view for explaining the assembling procedure of the one-way clutch of this disclosure and is a view of a state where phases of a screw hole of an output shaft (a first rotational body), the bolt hole (the first through hole) of the outer race (the second rotational member), and a bolt hole (a second through hole) of a flywheel (a second rotational body) are coincided.

The outer race 11b of the one-way clutch 11, which has been assembled to the fixing plate 13, is rotated in the rotational direction of the arrow R, and the mark $M_1$ is thereby coincided with the mark $M_2$ (FIG. 9). In this way, the phase of the screw hole 1d and the phase of the bolt hole 11c are coincided with each other at the optimum position for fastening of the bolt. More specifically, as shown in FIG. 5 described above, the screw hole 1d is brought into the state of being located on the first region $A_1$ side of the bolt hole 11c in the direction in which the outer race 11b can rotate. When the fastening bolt is inserted in the bolt hole 11c and fitted to the screw hole 1d in this state, the bolt is inserted in the bolt hole 11c such that the bolt is located in the first region. In this way, the outer race 11b and the output shaft 1a are fastened.

The flywheel 10 is assembled to the one-way clutch 11 that is in the state where the mark $M_1$ is coincided with the mark $M_2$ as described above (FIG. 10). The flywheel 10 is formed with the eight bolt holes 10a in the same pitch circle PC and at the same pitch as the bolt holes 11c and the screw holes 1d. The bolt hole 10a is a circular through hole in which the fastening bolt is inserted. A diameter of the bolt hole 10a is substantially equal to the dimension $d_1$ of the bolt hole 11c in a long hole shape of the outer race 11b (the dimension in the radial direction of the pitch circle PC). Then, a phase of the bolt hole 10a is coincided with the phases of the screw hole 1d and the first region of the bolt hole 11c. Unlike the one-way clutch 11, a rotational direction of the flywheel 10 at this stage is not restricted to one direction. Thus, the phase of the bolt hole 10a can easily be coincided with the phases of the screw hole 1d and the bolt hole 11c.

Figure 11:
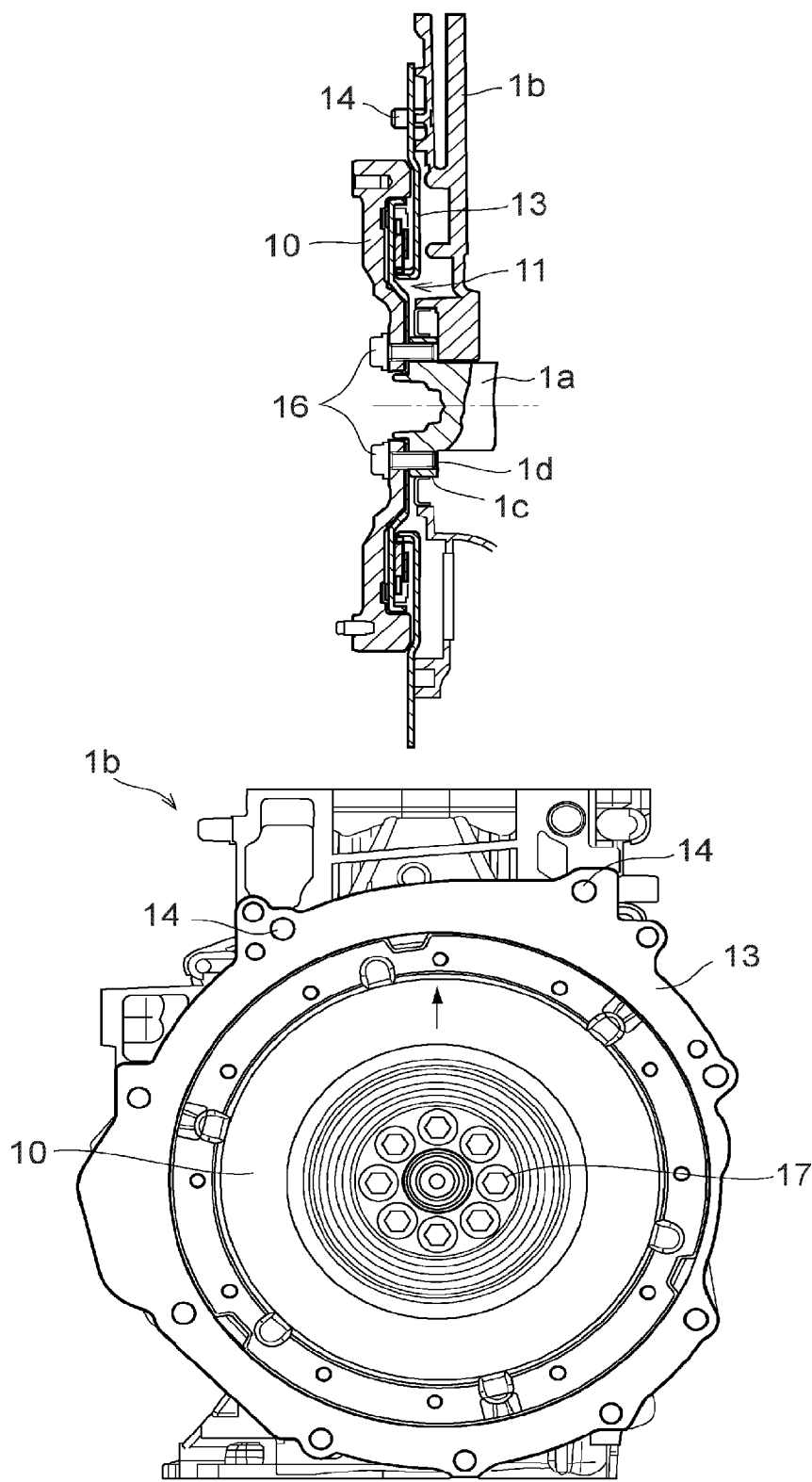
FIG. 11 is a view for explaining the assembling procedure of the one-way clutch of this disclosure and is a view of a state where the outer race (the second rotational member) and the flywheel (the second rotational body) are fastened to the output shaft (the first rotational body) by a bolt.

When the flywheel 10 is assembled to the one-way clutch 11 in a state where the phase of the bolt hole 10a is coincided with the phases of the screw hole 1d and the bolt hole 11c as described above, the flywheel 10 and the one-way clutch 11 are fastened to the output shaft 1a by a bolt 17 (FIG. 11). More specifically, the bolt 17 is inserted in the bolt hole 10a and the first region of the bolt hole 11c and is fitted to the screw hole 1d. In this way, the flywheel 10 and the one-way clutch 11 are fastened to the flange 1c of the output shaft 1a. That is, the assembly of the engine block 1b and the one-way clutch 11 is completed.

An operational effect of the one-way clutch according to the disclosure will hereinafter be described. According to this one-way clutch, the one-way clutch is constructed of the first rotational member and the second rotational member that make relative rotation to each other as well as the engagement mechanism for engaging the first rotational member with the second rotational member only in a specified rotational direction like the ratchet mechanism, for example. The first rotational member of the one-way clutch is attached to the engine block, the housing of a transmission, and the like, for example and is unrotatably fixed. Accordingly, the one-way clutch in this disclosure is used as the brake mechanism that restricts rotation of the second rotational member in the specified rotational direction. In addition, the second rotational member of the one-way clutch as described above is fastened to the first rotational body, such as the output shaft of the engine or the motor, by the bolt. In this way, the one-way clutch functions as the brake mechanism that restricts rotation of the first rotational body in the specified rotational direction. The first rotational body is formed with the screw hole to which the fastening bolt is fitted, and the second rotational member is formed with the first through hole in which the fastening bolt is inserted. Accordingly, the second rotational member and the first rotational body are fastened by inserting the bolt in the first through hole of the second rotational member and fitting the bolt to the screw hole of the first rotational body. In this case, the first through hole in this disclosure is the long hole that has the larger hole dimension in the circumferential direction of the pitch circle, in which the first through hole is arranged, than the hole dimension in the radial direction of the pitch circle. Thus, the phase of the first through hole of the second rotational member can easily be coincided with the phase of the screw hole of the first rotational body in the circumferential direction of the pitch circle. Therefore, the assemblability of the one-way clutch with the first rotational body can be improved.

Furthermore, in this disclosure, the bolt is inserted in the first through hole, and the second rotational member and the first rotational body are fastened by the bolt such that the bolt is located in the first region in the first through hole that has the long hole shape as described above. The first region is a region that is located on the side where the second rotational member can rotate in the circumferential direction of the pitch circle. Accordingly, even in the case where the screw head of the bolt and the inner surface of the bolt hole interfere with each other during fastening of the bolt, the second rotational member can move so as to escape in the direction to eliminate the interference. Therefore, when the one-way clutch, the rotation of which in the one direction is restricted, is assembled to the rotational body, the interference between the screw head of the bolt and the inner surface of the bolt hole is avoided, and thus these one-way clutch and rotational body can appropriately be fastened by the bolt.

In addition, according to this disclosure, the first rotational body and a second rotational body are fastened by the bolt with the second rotational member of the one-way clutch being interposed therebetween. The second rotational body is formed with a second through hole in the circular shape in which the fastening bolt is inserted, that is, in the normal shape. Accordingly, even when the first through hole of the second rotational member is the long hole, the first rotational body and the second rotational body can appropriately be fastened to the second rotational member of the one-way clutch by the bolt with a fastening force equivalent to the fastening force needed for normal fastening of the bolt for which the long hole is not used.

In addition, the fixing plate is attached to the fixing body, such as the engine block or the housing of the transmission. The first rotational member is unrotatably fixed to the fixing plate when the first rotational member is integrally fastened thereto. In the state where the first rotational member is fastened to the fixing plate, the second rotational member can rotate only in the one rotational direction with respect to the fixing plate and the fixing body. Furthermore, in this disclosure, the mark is added to each of the second rotational member and the fixing plate. Accordingly, when the mark of the second rotational member and the mark of the fixing plate are coincided with each other, the fastening bolt is brought into the state of being located in the first region of a first bolt hole that is formed in the second rotational member. That is, when the marks are coincided with each other, a phase of the first region of the first bolt hole and the phase of the screw hole of the first rotational body are coincided with each other in the circumferential direction of the pitch circle. Therefore, the one-way clutch and the first rotational body can easily be assembled.

It should be noted that, even in the case where the first through hole is displaced to the side where the first through hole interferes with the bolt with respect to the screw hole of the first rotational body due to an error during the assembly, displacement of the phase of the first rotational body, for example, the second rotational member can move so as to escape in the direction to eliminate the interference, as described above, during the fastening of the bolt in the state where the marks are coincided with each other as described above. Therefore, the second rotational member and the first rotational body or the second rotational member, the first rotational body, and the second rotational body can appropriately be fastened by the bolt while avoiding interference between the screw head of the bolt and the inner surface of the first through hole.

What is claimed is:

1. A one-way clutch comprising:
    a first rotational member;
    a second rotational member that rotates relative to the first rotational member, the second rotational member including plural first through holes in which bolts are inserted, the plural first through holes each arranged in a pitch circle, the first rotational member and the second rotational member engageable only in a specified rotational direction, and the second rotational member restricts rotation in the specified rotational direction by unrotatably fixing the first rotational member;
    a first rotational body having plural screw holes to which the bolts are fitted, the first rotational body and the second rotational member restrict rotation of the first rotational body in the specified rotational direction by being fastened by the bolts to each other,
    wherein a dimension of each first through hole in a circumferential direction of the pitch circle is larger than a dimension of the first through hole in a radial direction of the pitch circle,
    the first through holes including a first region and a second region, the first region and the second region are obtained by dividing the first through holes into two regions in the circumferential direction, and the first region is located ahead of the second region in a rotatable direction of the second rotational member, and
    the bolts are inserted such that each of the bolts is located in the first region of the corresponding first through hole, and the second rotational member and the first rotational body are fastened by the bolts.

2. The one-way clutch according to claim 1, further comprising:
    a second rotational body including plural second through holes, the second through holes being circular bolt holes in which the bolts are inserted, and a dimension in the radial direction of the first through hole being substantially equal to a diameter of the second through holes,
    wherein the second rotational member is arranged between the first rotational body and the second rotational body, and, together with the second rotational member, the second rotational body is fastened to the first rotational body by the bolt.

3. The one-way clutch according to claim 1, further comprising:
    a fixing body; and
    a fixing plate fastened to the fixing body, wherein the first rotational member is unrotatably fixed via the fixing plate, and the second rotational member and the fixing plate each have a mark, and, when positions of the marks of the second rotational member and the fixing plate are coincided with each other, a phase of the second rotational member is coincided with a phase of the fixing plate in the circumferential direction such that each of the bolts is located in the first region.

\* \* \* \* \*